(12) United States Patent
Ince et al.

(10) Patent No.: US 11,521,136 B2
(45) Date of Patent: Dec. 6, 2022

(54) RESTRICTING AIRPLANE PUSHBACK BASED ON GATE HOLD TIMES

(71) Applicant: AMERICAN AIRLINES, INC., Fort Worth, TX (US)

(72) Inventors: Ilhan Ince, Baltimore, MD (US); Lourdmareddy Gumireddy, Sewickley, PA (US); Noel Alfonso, Chandler, AZ (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 333 days.

(21) Appl. No.: 16/887,343

(22) Filed: May 29, 2020

(65) Prior Publication Data
US 2020/0293958 A1     Sep. 17, 2020

Related U.S. Application Data

(63) Continuation of application No. 13/837,462, filed on Mar. 15, 2013, now abandoned.

(51) Int. Cl.
*G06Q 10/02* (2012.01)
(52) U.S. Cl.
CPC .................. *G06Q 10/025* (2013.01)
(58) Field of Classification Search
CPC .................................................. G06Q 10/025
See application file for complete search history.

(56) References Cited

U.S. PATENT DOCUMENTS

| | | | |
|---|---|---|---|
| 3,668,403 A | 6/1972 | Meilander | |
| 5,181,677 A | 1/1993 | Kaplan | |
| 7,327,262 B2 * | 2/2008 | Motteram | G06Q 10/06 340/8.1 |
| 8,510,086 B1 | 8/2013 | Winkler | |
| 8,700,440 B1 * | 4/2014 | Ande | G06Q 10/06 705/5 |
| 10,210,766 B2 | 2/2019 | Ince | |
| 2008/0010918 A1 | 5/2008 | Kollgaard | |
| 2008/0013328 A1 | 6/2008 | Pandya | |
| 2009/0011263 A1 | 4/2009 | Kneller | |
| 2015/0016617 A1 | 6/2015 | Cox | |

OTHER PUBLICATIONS

Menkes et al., "America West Airlines Develops Efficient Boarding Strategies," Interfaces, vol. 35, No. 3, May-Jun. 2005, pp. 191-201.*

(Continued)

*Primary Examiner* — Nathan Erb
(74) *Attorney, Agent, or Firm* — Snell & Wilmer L.L.P.

(57) ABSTRACT

A misconnect management system models the movement of passengers, bags, and crew through flights and airports. In various embodiments, a misconnect management system identifies potential misconnected passengers and provides recommendations and input configured to support decision makers, such as ramp controllers and operations controller, in evaluating hold/no hold decisions for a flight. Via use of the misconnect management system and associated methods, misconnected passenger numbers may be reduced, expenses associated with missed connections may be reduced, and organizational efficiency may be improved.

20 Claims, 9 Drawing Sheets

(56) References Cited

OTHER PUBLICATIONS

USPTO, Non-Final Office Action dated Jul. 6, 2015 in U.S. Appl. No. 13/837,462.
USPTO, Non-Final Office Action dated Dec. 3, 2015 in U.S. Appl. No. 13/837,462.
USPTO, Final Office Action dated Apr. 14, 2016 in U.S. Appl. No. 13/837,462.
USPTO, Advisory Action dated Jun. 30, 2016 in U.S. Appl. No. 13/837,462.
USPTO, Non-Final Office Action dated Oct. 11, 2016 in U.S. Appl. No. 13/837,462.
USPTO, Final Office Action dated May 4, 2017 in U.S. Appl. No. 13/837,462.
USPTO, Advisory Action dated Jul. 17, 2017 in U.S. Appl. No. 13/837,462.
USPTO, Non-Final Office Action dated Jun. 19, 2018 in U.S. Appl. No. 13/837,462.
USPTO, Final Office Action dated Oct. 11, 2018 in U.S. Appl. No. 13/837,462.
USPTO, Advisory Action dated Oct. 31, 2018 in U.S. Appl. No. 13/837,462.
USPTO, Non-Final Office Action dated Jan. 2, 2019 in U.S. Appl. No. 13/837,462.
USPTO, Final Office Action dated Jun. 21, 2019 in U.S. Appl. No. 13/837,462.
USPTO, Advisory Action dated Aug. 15, 2019 in U.S. Appl. No. 13/837,462.
USPTO, Non-Final Office Action dated Jan. 10, 2020 in U.S. Appl. No. 13/837,462.
USPTO, Advisory Action dated May 14, 2020 in U.S. Appl. No. 13/837,462.

\* cited by examiner

Filter By—→ [CLT ▼]
Connecting City:

DEPARTURES - SUMMARY ▼

Data Last Update
2/19/2013 10:59 local<<<UTC-7
2/19/2013 17:59 gmt

Update Data

Expand Origination Details>>>>
Expand Conx Time Details>>>>

| Alert Level | Flight # | Origin (ConxHub) | Dest (Downline) | Equip | Dep Gate | Skp Dep/ETD | # of Flights w Miscx | Estimated Pax Misconnects - Total |
|---|---|---|---|---|---|---|---|---|
| 2 | 499 | CLT | LGA | 321 | C10 | 2/19/13 14:30 | 2 | 20 |
| 2 | 579 | CLT | RDU | 19W | B4 | 2/19/13 15:25 | 1 | 12 |

Filter By—>
Connecting City: CLT ⌄

[Update Data]

DEPARTURES - SUMMARY ⌄

Data Last Update
2/19/2013 10:59 local<<<UTC-7
2/19/2013 17:59 gmt

[Expand Origination Details>>>]
[Hide Conx Time Details<<<]

| Alert Level | Flight # | Origin (ConxHub) | Dest (Downline) | Equip | Dep Gate | Skp Dep/ ETD | # of Flights w Miscx | Estimated Pax Misconnects - Total | Pax by Available Connect Time ||||  |
|---|---|---|---|---|---|---|---|---|---|---|---|---|
| | | | | | | | | | <0 minutes | <10 minutes | <20 minutes | <30 minutes | >30 minutes |
| 2 | 499 | CLT | LGA | 321 | C10 | 2/19/13 14:30 | 2 | 20 | | 16 | 4 | | |
| 2 | 579 | CLT | RDU | 19W | B4 | 2/19/13 15:25 | 1 | 12 | | | 12 | | |

Filter By→ Connecting City: CLT ⌄

DEPARTURES - SUMMARY ⌄

Update Data

Expand Origination Details>>>>
Hide Conx Time Details<<<<

Data Last Update
2/19/2013 10:59 local<<<UTC-7
2/19/2013 17:59 gmt

| Alert Level | Flight # | Origin (ConxHub) | Dest (Downline) | Equip | Dep Gate | Skp Dep/ ETD | # of Flights w Miscx | Estimated Pax Misconnects - Total | Number of Pax Connection From | | | |
|---|---|---|---|---|---|---|---|---|---|---|---|---|
| | | | | | | | | | Domestic | Canada | Carib/Mex/SA | Europe |
| 2 | 499 | CLT | LGA | 321 | C10 | 2/19/13 14:30 | 2 | 20 | 20 | | | |
| 2 | 579 | CLT | RDU | 19W | B4 | 2/19/13 14:25 | 1 | 12 | 12 | | | |

Details of Arriving Flights Connecting to Flight 499

Local Times

| Connections Info for Departing Flight 499 CLTLGA | | | | Dep Gate C10 | | Skp Dep/ETD 2/19/13 14:30 | | Departing Early(-)/Late Minutes 0 | | ETA (Early/late) at Destination Minutes 0 | | Next Flt in Same Market 3232 | Time on Ground for Next Flt 0:35 |
|---|---|---|---|---|---|---|---|---|---|---|---|---|---|
| Arriving From Flight # | Origin (Upline) | Dest (Conx Hub) | Equip | Arrival Gate | Skd Arrival or At Gate ETA / (Early/Late) | Phase of Flight | Available Time To Connect (ETD-ETA) | Time Reqd to Connect/ Slack | Potential Misconnects | Misconnects saved with Hold |
| 561 | MSY | CLT | 734 | B7 | 14:25 / 29 L | Off | 5 | 19/-14 | 16 | |
| 792 | DFW | CLT | 321 | B10 | 14:11 / 32 L | Off | 19 | 20/-1 | 4 | |

Hold Matrix

DEPARTURES – HOLD MATRIX FOR FLIGHT 499 CLT-LGA SCHEDULED DEPARTURE: 2/19/2013 2:30:00 PM

| Hold Mins After Sched Departure | Early/late at Downline | Misconnects | | | | | Saved Pax by Upline Profile | | | | |
|---|---|---|---|---|---|---|---|---|---|---|---|
| | | Dom | Canada | Carib/Mex/SA | Int | Total | Dom | Canada | Carib/Mex/SA | Int | Total |
| 0 | 0 | 20 | 0 | 0 | 0 | 20 | 0 | 0 | 0 | 0 | 0 |
| 5 | 5 | 16 | 0 | 0 | 0 | 16 | 4 | 0 | 0 | 0 | 4 |
| 10 | 13 | 16 | 0 | 0 | 0 | 16 | 4 | 0 | 0 | 0 | 4 |
| 15 | 18 | 0 | 0 | 0 | 0 | 0 | 20 | 0 | 0 | 0 | 20 |
| 20 | 24 | 0 | 0 | 0 | 0 | 0 | 20 | 0 | 0 | 0 | 20 |
| 25 | 29 | 0 | 0 | 0 | 0 | 0 | 20 | 0 | 0 | 0 | 20 |
| 30 | 35 | 0 | 0 | 0 | 0 | 0 | 20 | 0 | 0 | 0 | 20 |

RESTRICTING AIRPLANE PUSHBACK BASED ON GATE HOLD TIMES

CROSS-REFERENCE TO RELATED APPLICATIONS

This application is a continuation of, claims priority to and the benefit of, U.S. Ser. No. 13/837,462 filed Mar. 15, 2013 entitled "MISCONNECT MANAGEMENT SYSTEMS AND METHODS," which is incorporated herein in its entirety for all purposes.

TECHNICAL FIELD

The present disclosure generally relates to operational modeling, and more particularly, to analysis methods and tools suitable to monitor and control the flow of passengers and luggage through a transportation system.

BACKGROUND

Air travel, particularly over long distances, is commonly divided into multiple flight segments or "legs". For example, a passenger traveling from Jacksonville (JAX) to Los Angeles (LAX) may travel from JAX to Dallas/Fort Worth (DFW) on a first leg, and then from DFW to LAX on a second leg. Similarly, an airline crew member may first work a flight from Phoenix (PHX) to Philadelphia (PHL), then a flight from PHL to Baltimore (BWI), and then a flight from BWI to Miami (MIA). Airline flight schedules are typically configured to accommodate various combinations of connecting flights in order to maximize utilization of airline resources, accommodate passenger travel demand, increase revenue, decrease expenses, and/or the like.

However, due to weather, equipment malfunction and/or the like, airline flights regularly arrive at a later time than initially scheduled. When a flight is delayed, passengers, luggage, and/or crew may fail to connect to the next leg of a route, leading to missed connection expenses for the airline (e.g., hotel accommodations, placement of passengers who missed a connection on another flight in lieu of a paid booking, activation of reserve crew to cover for the missed crew connection, and/or the like) and/or the passenger (e.g. if the delay was due to a circumstance beyond airline control, such as weather). Accordingly, systems and methods for reducing the incidence of missed connections (and/or reducing or minimizing the expense of missed connections) remain desirable.

SUMMARY

In an embodiment, a method comprises: modeling, by a processor for misconnect management, movement of a passenger through a transportation system; identifying, by the processor, the passenger as a misconnected passenger; and determining, by the processor, a set of gate hold times for a first flight in the transportation system. The first flight is associated with the misconnected passenger. The method further comprises communicating, by the processor and to a user, the set of suggested gate hold times for the first flight.

In another embodiment, a non-transitory computer-readable storage medium has computer-executable instructions stored thereon that, in response to execution by a processor for misconnect management, causes the processor to perform operations comprising: modeling, by the processor, movement of a passenger through a transportation system; identifying, by the processor, the passenger as a misconnected passenger; determining, by the processor, a set of gate hold times for a first flight in the transportation system, wherein the first flight is associated with the misconnected passenger; and communicating, by the processor and to a user, the set of suggested gate hold times for the first flight.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

FIGS. 2C through 2G illustrate views of an exemplary misconnect interface in an exemplary misconnect module, in accordance with various embodiments.

DETAILED DESCRIPTION

Figure 1:
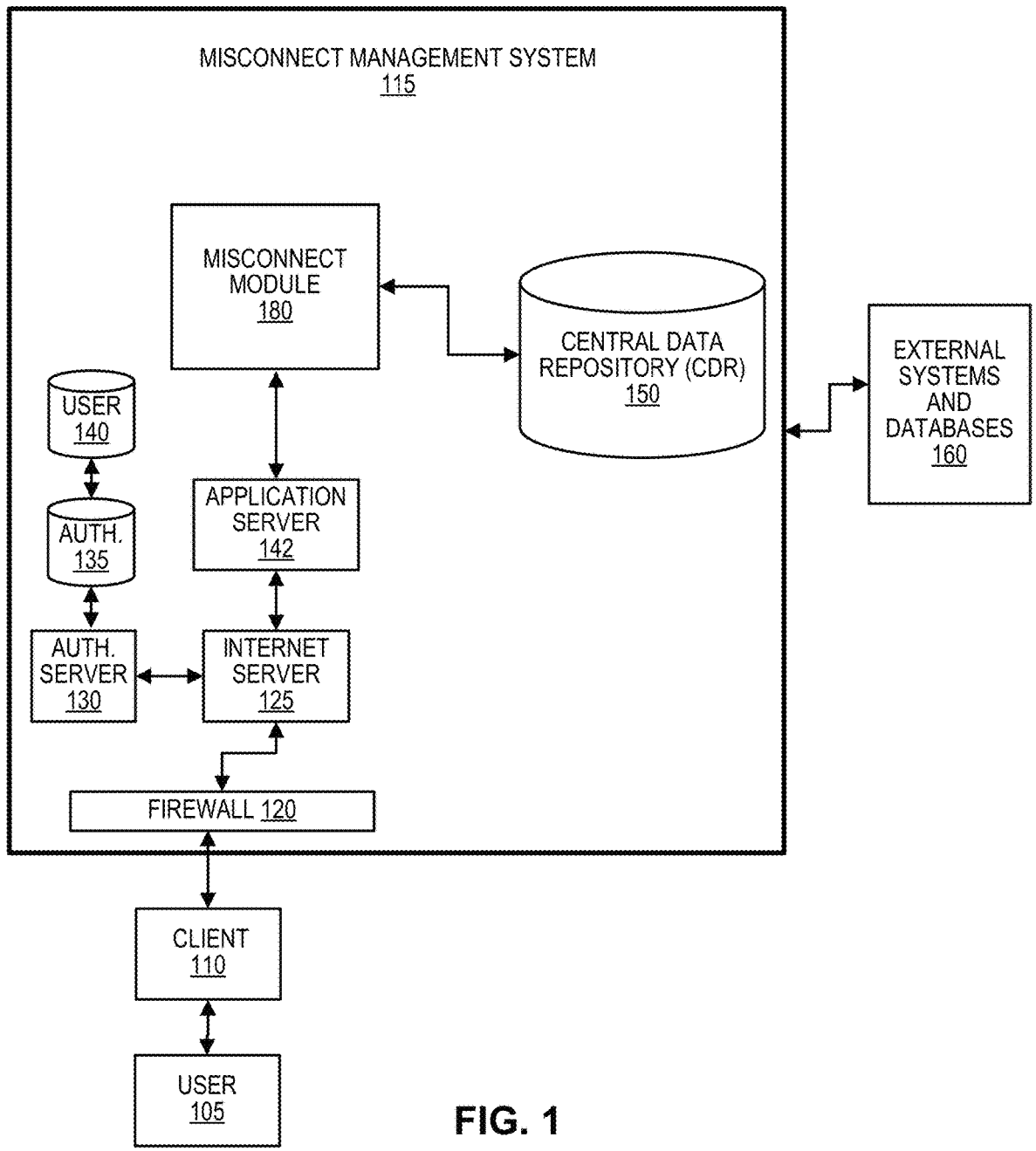
FIG. 1 is a block diagram illustrating exemplary misconnect management system components, in accordance with various embodiments.

The following description is of various embodiments only, and is not intended to limit the scope, applicability, or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the present disclosure or appended claims.

For the sake of brevity, conventional techniques for airline flight scheduling, operations management, statistical analysis, process optimization, software application development, and/or the like, may not be described in detail herein. Furthermore, the connecting lines shown in various figures contained herein are intended to represent exemplary functional relationships and/or physical or communicative couplings between various elements. It should be noted that many alternative or additional functional relationships or physical or communicative connections may be present in a practical misconnect management system.

Station and flight crew strive to pushback an aircraft from a gate in order to conform to a scheduled departure time. However, due to airport congestion and other factors, it may be possible for pushback of a flight to be delayed (for example, due to a gate hold) without significant adverse impact on arrival time at the destination (for example, due to tail winds, by modifying in-flight airspeed to the destination, by moving the flight up in a taxi queue, and/or the like). Additionally, even if a flight is held at the gate for a period of time, and consequently delayed in arriving at the destination, the adverse impact at the destination may be acceptable. Stated generally, the benefits of holding a flight to allow one or more passengers or bags to connect may outweigh the drawbacks associated with holding a departing flight at the gate for a period of time.

Accordingly, features and principles of the present disclosure contemplate improved misconnect management methods and systems. By evaluating exemplary information (e.g., passenger information, bag information, crew information, and flight schedule execution information), all on a continuous, real-time, and/or discrete basis, exemplary misconnect management systems and methods enhance the hold-for-connection decision making process. In this manner, misconnect expenses may be reduced and/or minimized, improved airline resource utilization may be realized, customer goodwill may be increased, and/or the like.

While the present disclosure discusses airlines, flights, pilots, flight attendants, ramp controllers, air traffic controllers, passengers, bags, and/or the like for purposes of convenience and illustration, one of skill in the art will appreciate that the misconnect management methods, systems, and tools disclosed herein are broadly applicable, for example to transportation industries of various sorts (e.g., buses, trains, ships, trucks, automobiles and/or the like), freight and parcel shipping, supply chain management, and/or the like.

Various embodiments employ forecasting, statistical analysis and/or optimization techniques. For more information regarding such techniques refer to, for example: "The Theory and Practice of Revenue Management" (International Series in Operations Research & Management Science) by Kalyan T. Talluri and Garrett J. van Ryzin; "Using Multivariate Statistics (5th Edition)" by Barbara G. Tabachnick and Linda S. Fidell; and "Introduction to Operations Research" by Friedrich S. Hiller and Gerald J. Lieberman, McGraw-Hill 7th edition, Mar. 22, 2002; the contents of which are each hereby incorporated by reference in their entireties.

In various embodiments, exemplary misconnect management systems include a user interface ("UI"), software modules, logic engines, various databases, interfaces to systems and tools, and/or computer networks. While exemplary misconnect management systems may contemplate upgrades or reconfigurations of existing processes and/or systems, changes to existing databases and system tools are not necessarily required by principles of the present disclosure.

The benefits provided by features and principles of the present disclosure include, for example, reduced passenger misconnects, reduced bag misconnects, reduced crew misconnects, increased customer goodwill, reduced passenger misconnect expenses (e.g., housing expenses, food expenses, mandated payments, customer spoiled seat costs, seat displacement costs, and/or the like), reduced bag misconnect expenses, increased planning and operational efficiency, increased employee morale, and the like.

As used herein, an "entity" may include any individual, software program, business, organization, government entity, web site, system, hardware, and/or any other entity. A "user" may include any entity that interacts with a system and/or participates in a process. "Upline" means a flight leg or location disposed earlier in a route; "downline" means a flight leg or location disposed later in a route (thus, for example, for an aircraft travelling from PHX to DFW to New York (JFK), the PHX→DFW leg is upline from the DFW→JFK leg; for the PHX=DFW leg, PHX is the upline station and DFW is the downline station, and so forth).

Turning now to FIG. 1, in accordance with various embodiments, a user 105 may perform tasks such as requesting, retrieving, receiving, updating, analyzing and/or modifying data. User 105 may also perform tasks such as initiating, manipulating, interacting with or using a software application, tool, module or hardware, and initiating, receiving or sending a communication. User 105 may interface with Internet server 125 via any communication protocol, device or method discussed herein, known in the art, or later developed. User 105 may be, for example, a ramp controller, an air traffic controller, an airport, a customer service center, an operations control center, a member of an operations research or systems analysis organization, a downstream system, an upstream system, a third-party system, a system administrator, and/or the like.

In various embodiments, a system 101 may include a user 105 interfacing with a misconnect management system 115 by way of a client 110. Misconnect management system 115 may be a partially or fully integrated system comprised of various subsystems, modules and databases. Client 110 comprises any hardware and/or software suitably configured to facilitate entering, accessing, requesting, retrieving, updating, analyzing and/or modifying data. The data may include operational data (e.g., schedules, resources, routes, operational alerts, weather, passenger data, etc.), airport data (for example, gate-to-gate travel information, taxi queue information, runway information, arriving and/or departing flight information, and/or the like), cost data, forecasts, historical data, verification data, asset (e.g., airplane) data, regulatory data, authentication data, demographic data, transaction data, or any other suitable information discussed herein.

Client 110 includes any device (e.g., a computer), which communicates, in any manner discussed herein, with misconnect management system 115 via any network or protocol discussed herein. Browser applications comprise Internet browsing software installed within a computing unit or system to conduct online communications and transactions. These computing units or systems may take the form of personal computers, mobile phones, personal digital assistants, mobile email devices, laptops, notebooks, hand-held computers, portable computers, kiosks, and/or the like. Practitioners will appreciate that client 110 may or may not be in direct contact with misconnect management system 115. For example, client 110 may access the services of misconnect management system 115 through another server, which may have a direct or indirect connection to Internet server 125. Practitioners will further recognize that client 110 may present interfaces associated with a software application (e.g., SAS analytic software) or module that are provided to client 110 via application graphical user interfaces (GUIs) or other interfaces and are not necessarily associated with or dependent upon Internet browsers or Internet-specific protocols.

User 105 may communicate with misconnect management system 115 through a firewall 120, for example to help ensure the integrity of misconnect management system 115 components. Internet server 125 may include any hardware and/or software suitably configured to facilitate communications between the client 110 and one or more misconnect management system 115 components.

Firewall 120, as used herein, may comprise any hardware and/or software suitably configured to protect misconnect management system 115 components from users of other networks. Firewall 120 may reside in varying configurations including stateful inspection, proxy based and packet filtering, among others. Firewall 120 may be integrated as software within Internet server 125, any other system 101 component, or may reside within another computing device or may take the form of a standalone hardware component.

Authentication server 130 may include any hardware and/or software suitably configured to receive authentication credentials, encrypt and decrypt credentials, authenticate credentials, and/or grant access rights according to predefined privileges associated with the credentials. Authentication server 130 may grant varying degrees of application and/or data level access to users based on information stored within authentication database 135 and user database 140. Application server 142 may include any hardware and/or software suitably configured to serve applications and data to a connected client 110.

In accordance with various embodiments, misconnect management system 115 is usable to: model passenger and/or bag flow through various flight legs and airports; generate recommendations, for example for a ramp controller or an operations controller; generate inputs to other forecasting systems; and/or evaluate proposed courses of action (for example, a proposed gate hold time for a flight). Continuing to reference FIG. 1, misconnect management system 115 allows communication with central data repository (CDR) 150, and with various other databases, tools, UIs and systems, for example external systems and databases 160. Such systems include, for example, airline scheduling systems, air traffic control systems, ground traffic control systems, and/or the like. In various embodiments, external systems and databases 160 include a flight operations system, an airline reservation system, and/or the like.

Misconnect management system 115 components may be interconnected and communicate with one another to allow for a completely integrated misconnect management system. In various embodiments, misconnect management system 115 models passenger flow, bag flow, crew flow, and schedule execution on a continuous and/or real-time basis. In other embodiments, misconnect management system 115 models on a discrete basis (for example, every fifteen seconds, every thirty seconds, every one minute, every two minutes, and/or the like). Ramp controllers may make flight pushback decisions and/or gate hold decisions based at least in part upon output of (and/or guidance or suggestions received from) misconnect management system 115; moreover, airport staff, operational control staff, gate staff, flight attendants, reservation staff, and/or other users 105 may make decisions, for example flight scheduling decisions, customer seating decisions, flight gate assignment decisions, and/or the like, based at least in part upon output of (and/or guidance or suggestions received from) misconnect management system 115.

In various embodiments, certain misconnect management system 115 modules (e.g., misconnect module 180) are software modules configured to enable online functions such as sending and receiving messages, receiving query requests, configuring responses, dynamically configuring user interfaces, requesting data, receiving data, displaying data, executing complex processes, calculations, forecasts, mathematical techniques, workflows and/or algorithms, prompting user 105, verifying user responses, authenticating the user, initiating misconnect management system 115 processes, initiating other software modules, triggering downstream systems and processes, encrypting and decrypting, and/or the like. Additionally, misconnect management system 115 modules may include any hardware and/or software suitably configured to receive requests from client 110, for example via Internet server 125 and application server 142. It will be appreciated that, while misconnect module 180 is illustrated as a separate module in FIG. 1, in various embodiments components of misconnect management system 115 (and/or functionality thereof) may be combined into fewer modules or components, or alternatively, divided into additional modules and/or components.

Misconnect management system 115 modules may be further configured to process requests, execute transactions, construct database queries, and/or execute queries against databases within system 101 (e.g., CDR 150), external data sources and/or temporary databases. In various embodiments, one or more misconnect management system 115 modules may be configured to execute application programming interfaces in order to communicate with a variety of messaging platforms, such as email systems, wireless communications systems, mobile communications systems, multimedia messaging service ("MMS") systems, short messaging service ("SMS") systems, and the like.

Misconnect management system 115 modules may be configured to exchange data with other systems and application modules, for example, a customer service system, an airline rewards system, a ground traffic control system, and/or the like. In various embodiments, misconnect management system 115 modules may be configured to interact with other system 101 components to perform complex calculations, retrieve additional data, format data into reports, create XML representations of data, construct markup language documents, construct, define or control UIs, and/or the like. Moreover, misconnect management system 115 modules may reside as standalone systems or tools, or may be incorporated with the application server 142 or any other misconnect management system 115 component as program code. As one of ordinary skill in the art will appreciate, misconnect management system 115 modules may be logically or physically divided into various subcomponents, such as a workflow engine configured to evaluate predefined rules and to automate processes.

In addition to the components described above, misconnect management system 115 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; a plurality of databases, and/or the like.

As will be appreciated by one of ordinary skill in the art, one or more misconnect management system 115 components may be embodied as a customization of an existing system, an add-on product, upgraded software, a stand-alone system (e.g., kiosk), a distributed system, a method, a data processing system, a device for data processing, and/or a computer program product. Accordingly, individual misconnect management system 115 components may take the form of an entirely software embodiment, an entirely hardware embodiment, or an embodiment combining aspects of both software and hardware. Furthermore, individual misconnect management system 115 components may take the form of a computer program product on a computer-readable storage medium having computer-readable program code means embodied in the storage medium. Any suitable computer-readable storage medium may be utilized, including magnetic storage devices (e.g., hard disks), optical storage devices (e.g., DVD-ROM, CD-ROM, etc.), electronic storage devices (e.g., flash memory), and/or the like.

Client 110 may include an operating system (e.g., Windows, UNIX, Linux, Solaris, MacOS, iOS, Android, Windows Mobile OS, Windows CE, Palm OS, Symbian OS, Blackberry OS, J2ME, etc.) as well as various conventional support software and drivers typically associated with mobile devices and/or computers. Client 110 may be in any environment with access to any network, including both wireless and wired network connections. In various embodiments, access is through a network or the Internet through a commercially available web-browser software package. Client 110 and misconnect management system 115 components may be independently, separately or collectively suitably coupled to the network via data links which include, for example, a connection to an Internet Service Provider (ISP) over the local loop as is typically used in connection with standard wireless communications networks and/or methods, such as modem communication, cable modem, satellite networks, ISDN, digital subscriber line (DSL), and/or the like. In various embodiments, any portion of client 110 may be partially or fully connected to a network using a wired ("hard wire") connection. As those skilled in the art will appreciate, client 110 and/or any of the system components may include wired and/or wireless portions.

In various embodiments, components, modules, and/or engines of misconnect management system 115 may be implemented as micro-applications or micro-apps. Micro-apps are typically deployed in the context of a mobile operating system, including for example, a Palm mobile operating system, a Windows mobile operating system, an Android operating system, Apple iOS, a Blackberry operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

Internet server 125 may be configured to transmit data to client 110 within markup language documents. "Data" may include encompassing information such as commands, messages, transaction requests, queries, files, data for storage, and/or the like in digital or any other form. Internet server 125 may operate as a single entity in a single geographic location or as separate computing components located together or in separate geographic locations. Further, Internet server 125 may provide a suitable web site or other Internet-based graphical user interface, which is accessible by users (such as user 105). In various embodiments, Microsoft Internet Information Server (IIS), Microsoft Transaction Server (MTS), and Microsoft SQL Server, are used in conjunction with a Microsoft operating system, Microsoft NT web server software, a Microsoft SQL Server database system, and a Microsoft Commerce Server. In various embodiments, the well-known "LAMP" stack (Linux, Apache, MySQL, and PHP/Perl/Python) are used to enable misconnect management system 115. Additionally, components such as Access or Microsoft SQL Server, Oracle, Sybase, InterBase, etc., may be used to provide an Active Data Object (ADO) compliant database management system.

Like Internet server 125, application server 142 may communicate with any number of other servers, databases and/or components through any means known in the art. Further, application server 142 may serve as a conduit between client 110 and the various systems and components of misconnect management system 115. Internet server 125 may interface with application server 142 through any means known in the art including a LAN/WAN, for example. Application server 142 may further invoke software modules, misconnect module 180, automatically or in response to user 105 requests.

Any of the communications, inputs, storage, databases or displays discussed herein may be facilitated through a web site having web pages. The term "web page" as it is used herein is not meant to limit the type of documents and applications that may be used to interact with the user. For example, a typical web site may include, in addition to standard HTML documents, various forms, Java applets, JavaScript, active server pages (ASP), common gateway interface scripts (CGI), Flash files or modules, FLEX, ActionScript, extensible markup language (XML), dynamic HTML, cascading style sheets (CSS), helper applications, plug-ins, and/or the like. A server may include a web service that receives a request from a web server, the request including a URL (e.g., http://yahoo.com/) and/or an internet protocol ("IP") address. The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003).

Continuing to reference FIG. 1, illustrated are databases that are included in various embodiments. An exemplary list of various databases used herein includes: an authentication database 135, a user database 140, CDR 150 and/or other databases that aid in the functioning of the system. As practitioners will appreciate, while depicted as separate and/or independent entities for the purposes of illustration, databases residing within misconnect management system 115 may represent multiple hardware, software, database, data structure and networking components. Furthermore, embodiments are not limited to the databases described herein, nor do embodiments necessarily utilize each of the disclosed databases.

Authentication database 135 may store information used in the authentication process such as, for example, user identifiers, passwords, access privileges, user preferences, user statistics, and the like. User database 140 maintains user information and credentials for misconnect management system 115 users (e.g., user 105).

In various embodiments, CDR 150 is a data repository that may be configured to store a wide variety of comprehensive data for misconnect management system 115. While depicted as a single logical entity in FIG. 1, those of skill in the art will appreciate that CDR 150 may, in various embodiments, consist of multiple physical and/or logical data sources. In various embodiments, CDR 150 stores passenger data, deplane rate data, taxi rate data, flight booking data, crew schedules, taxi queue data, operational data, flight schedules, resource data, asset data, inventory data, personnel information, routes and route plans, station (e.g., airports or other terminals) data, operational alert data, weather information, cost data, optimization results, booking class data, forecasts, historical data, verification data, authentication data, demographic data, legal data, regulatory data, transaction data, security profiles, access rules, content analysis rules, audit records, predefined rules, process definitions, financial data, and the like. For example, a data source or component database of CDR 150 includes, but is not limited to, information regarding passenger itineraries, passenger connection types, passenger frequent flyer program status, passenger ticket fare, and/or the like.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), Ehcache, Couchbase, VoltDB, Versant, Hazelcast, or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of system 101 may consist of any combination thereof at a single location or at multiple locations, wherein each database or system includes any of various suitable security features, such as firewalls, access codes, encryption, decryption, compression, decompression, and/or the like.

The systems and methods may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, Flash, ActionScript, FLEX, VBScript, Macromedia Cold Fusion, COBOL, Microsoft Active Server Pages, assembly, PERL, SAS, PHP, awk, Python, Visual Basic, SQL Stored Procedures, PL/SQL, any UNIX shell script, and/or extensible markup language (XML) or the like, with the various algorithms being implemented with any combination of data structures, objects, processes, routines or other programming elements. Further, it should be noted that the system may employ any number of conventional techniques for data transmission, signaling, data processing, network control, and the like. Still further, the system may be used to detect or prevent security issues with a client-side scripting language, such as JavaScript, VBScript or the like.

Software elements may be loaded onto a general purpose computer, special purpose computer, or other programmable data processing apparatus to produce a machine, such that the instructions execute on the computer or other programmable data processing means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified herein or in flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

With continued reference to FIG. 1, in various embodiments, user 105 logs onto an application (e.g., a module) and Internet server 125 may invoke an application server 142. Application server 142 invokes logic in misconnect management system 115 by passing parameters relating to user's 105 requests for data. Misconnect management system 115 manages requests for data from misconnect management system 115 modules and/or communicates with system 101 components. Transmissions between user 105 and Internet server 125 may pass through a firewall 120 to help ensure the integrity of misconnect management system 115 components. Practitioners will appreciate that exemplary embodiments may incorporate any number of security schemes or none at all. In various embodiments, Internet server 125 receives requests from client 110 and interacts with various other system 101 components to perform tasks related to requests from client 110.

Internet server 125 may invoke an authentication server 130 to verify the identity of user 105 and assign roles, access rights and/or permissions to user 105. In order to control access to the application server 142 or any other component of misconnect management system 115, Internet server 125 may invoke an authentication server 130 in response to user 105 submissions of authentication credentials received at Internet server 125. In response to a request to access system 101 being received from Internet server 125, Internet server 125 determines if authentication is required and transmits a prompt to client 110. User 105 enters authentication data at client 110, which transmits the authentication data to Internet server 125. Internet server 125 passes the authentication data to authentication server 130 which queries the user database 140 for corresponding credentials. In response to user 105 being authenticated, user 105 may access various applications and their corresponding data sources.

Figure 2A:
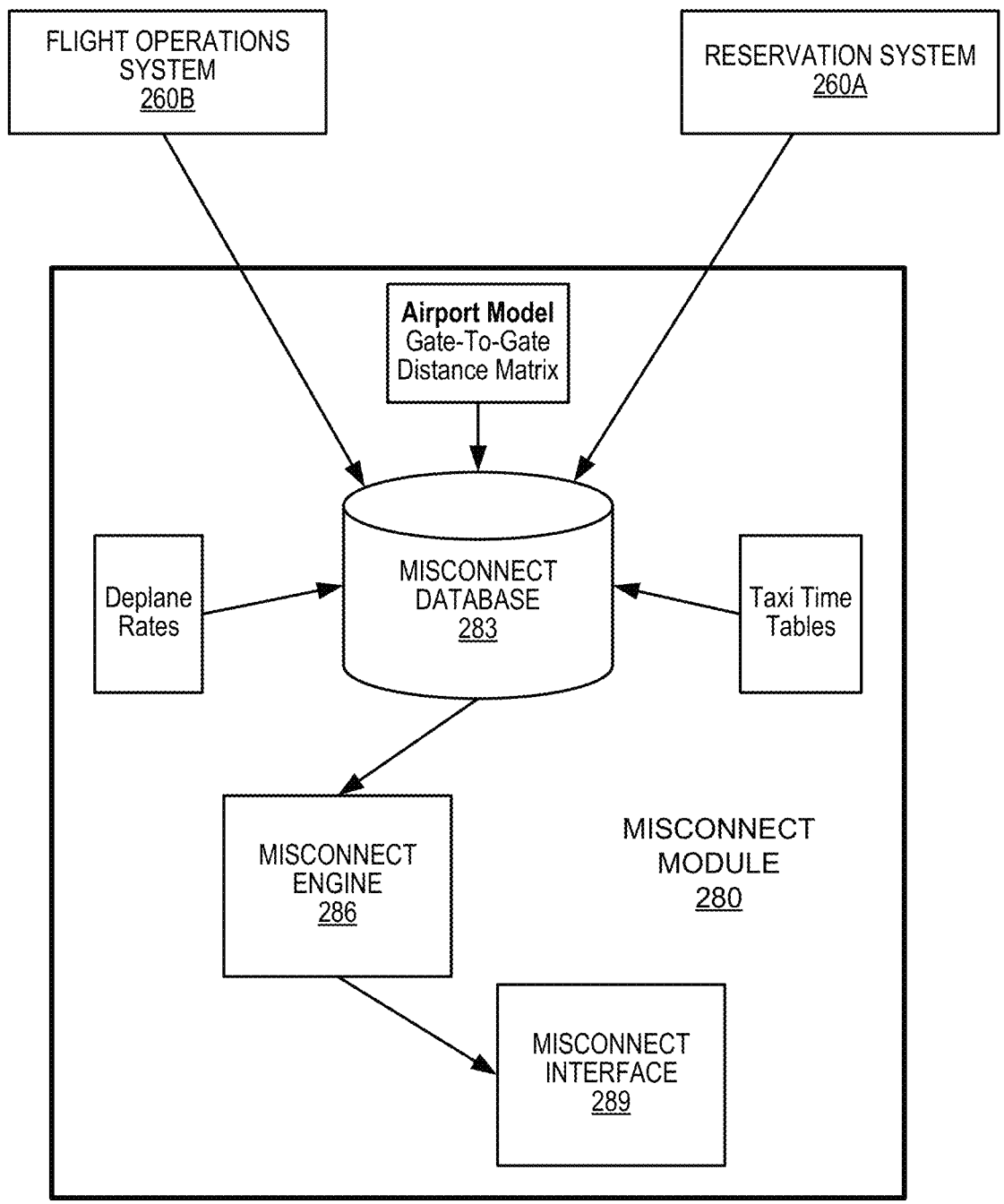
FIG. 2A illustrates a block diagram of operation of an exemplary misconnect module, in accordance with various embodiments.
Figure 2B:
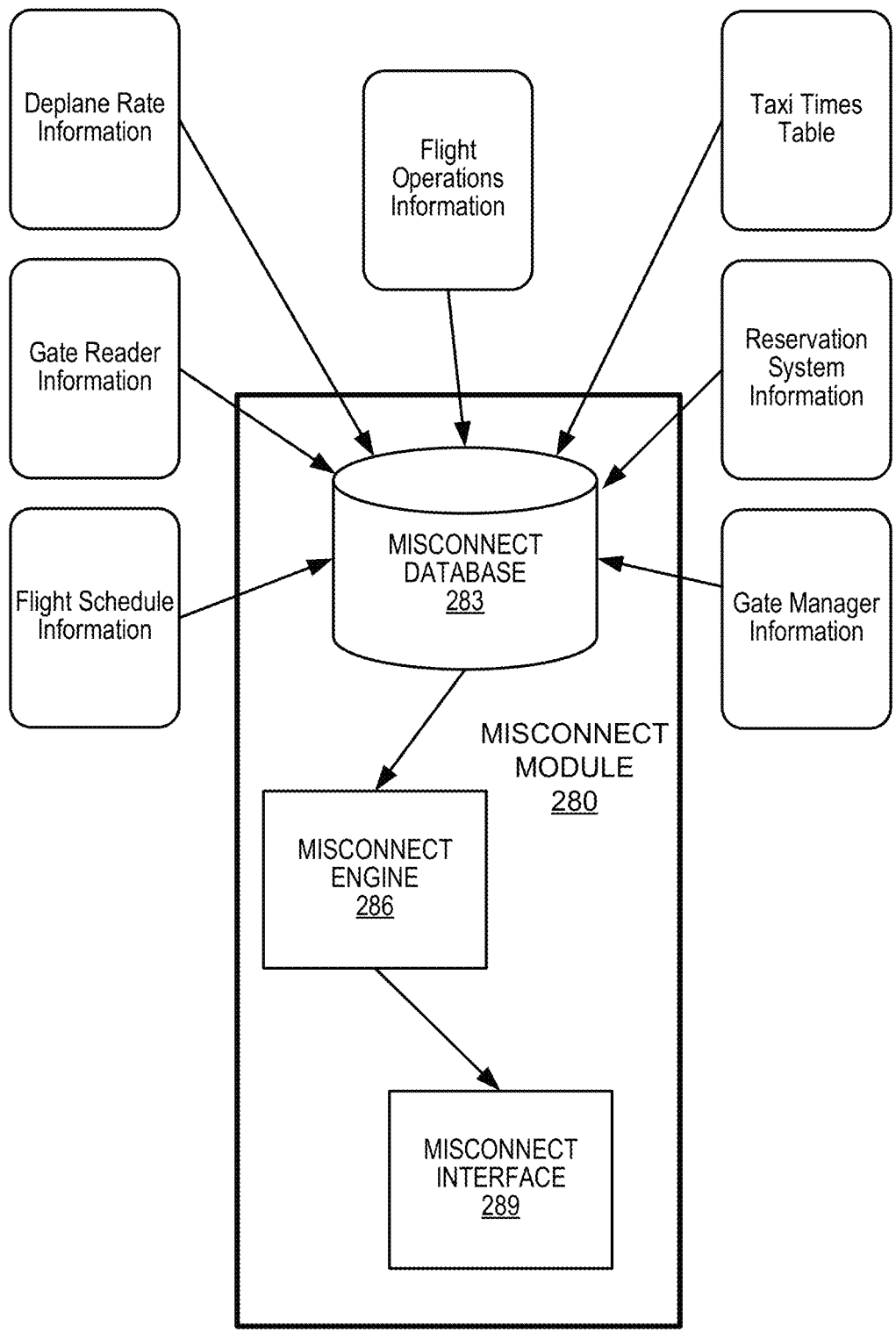
FIG. 2B illustrates a block diagram of operation of an exemplary misconnect module, in accordance with various embodiments.
Figure 3:
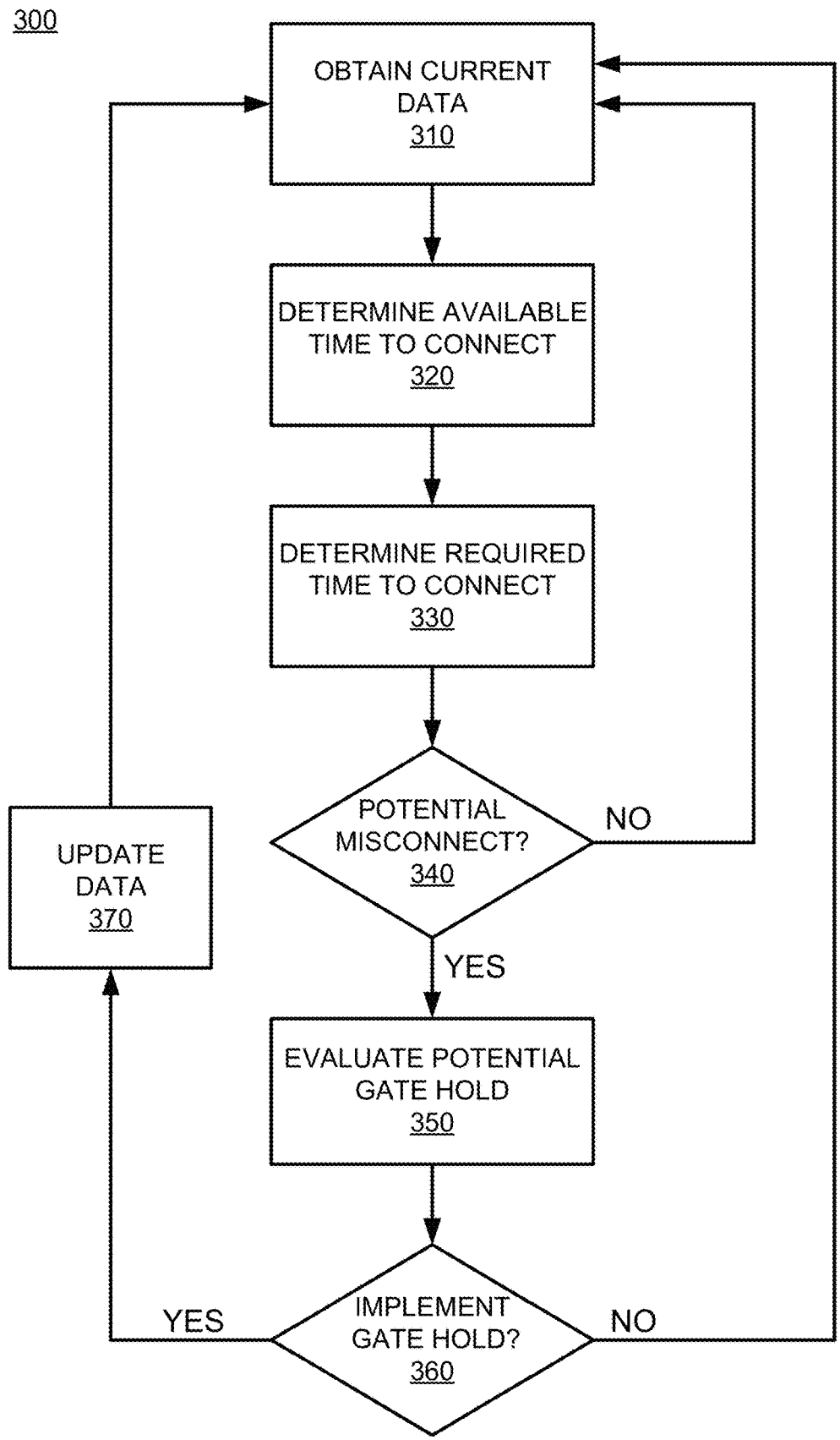
FIG. 3 illustrates an exemplary method for misconnect management, in accordance with various embodiments.

With reference now to FIGS. 1 through 3, in various embodiments, a misconnect management system 115 and/or method 300 utilize a model for misconnect management configured to consolidate and/or evaluate passenger information, bag information, crew information, and/or flight schedule execution information. Output of misconnect management system 115 and/or method 300 may be utilized to inform flight pushback decisions, make gate change decisions, rebook potentially misconnected passengers, assess expenses associated with a missed connection, and/or the like.

In various embodiments, misconnect management system 115 is configured to consolidate and process real-time connecting passenger, bags, crew, and airline operations data in order to rapidly identify potential misconnections after a deviation in airline operations arises. Misconnect management system 115 may be utilized as a decision support tool, for example for ramp tower personnel, customer service personnel, operations control center personnel, and/or the like, in order to manage and/or mitigate the effects of operational disruptions on customers and on an airline as a whole.

In various embodiments, misconnect management system 115 is configured with a misconnect module 180, for example misconnect module 280. Misconnect module 280 may comprise misconnect database 283, misconnect engine 286, and misconnect interface 289.

Misconnect database 283 is configured to contain and/or access information suitable for use by misconnect module 280. It will be appreciated that, as illustrated in FIGS. 2A and 2B, misconnect database 283 may be a portion of misconnect module 280; however, misconnect database 283 may also be implemented external to and/or accessible by misconnect module 280.

Misconnect database 283 may be updated as frequently as suitable for operation of misconnect module 280. In an embodiment, misconnect database 283 is updated in real-time as data updates are received. In other embodiments, misconnect database 283 is updated at intervals (for example, every 15 seconds, every 30 seconds, every 1 minute, and/or the like).

Misconnect database 283 may receive, store, and/or access information associated with a flight, for example, bookings on a prior flight leg, seat assignments, connecting flight information, final destination information, prior leg estimated time of arrival (ETA), prior leg arrival time, arrival gate, departure gate, gate-to-gate distance information, deplaning rates, flight estimated time of departure (ETD), flight plan block time, scheduled flight departure time, estimated taxi times, flight ETA at a downline station, and/or the like.

It will be appreciated that as an airline day of operations develops, the source and quality of data available to and/or stored in misconnect database 283 may vary. For example, at a certain time before a flight departure (for example, 40 minutes), the best estimate for the number of passengers expected to be on board is usually the number of bookings for that flight, which may be available from a reservation system, for example reservation system 260A. However, between 30 minutes prior to departure and departure, the best estimate of the number of passengers expected to be on board is typically available from check-in process data, which may be available from a flight operations system 260B. Additionally, after departure the best estimate of the number of passengers on board (i.e., actual numbers) is flight closeout data from a gate reader or manual flight closeout updates.

Similarly, in misconnect management system 115, time horizon has an impact on flight ETA. Before a flight departs, the best estimate of its ETA at the destination is usually based on operations data (for example, estimated departure time) and historical estimates (for example, estimated taxi-out time+flight plan enroute+estimated taxi-in time). However, once a flight departs, the best estimate of ETA at the destination is based on FLIFO ("flight information"), because the uncertainty of gate departure time is removed. It will be appreciated that ETA accuracy progressively improves as the flight progresses to the arrival station. Accordingly, misconnect database 283 is configured to access and/or utilize multiple data sources, as suitable, for example depending on the time of day, the time before departure of a particular flight, the time before arrival of a particular flight, and/or the like.

Misconnect management system 115 is thus configured to regularly update, revise, and or recalculate misconnected passenger, bag, and/or crew information, for example every one minute, in order to provide accurate estimates. Misconnect database 283 is configured to obtain, access, fuse, and/or store such information for use by misconnect engine 286 or other components of misconnect management system 115.

Misconnect engine 286 accesses data in misconnect database 283 and performs operations thereon. Misconnect engine 286 is configured to perform calculations, model outcomes, generate recommendations, and otherwise facilitate improved decision making, for example a hold/no hold decision for a flight. In various embodiments, misconnect engine 286 is configured to determine Available Time to Connect (ATC) and Required Time to Connect (RTC) for each connecting passenger, bag, and/or crew member associated with a flight. When RTC>ATC for a passenger, bag, or crew member, they may be flagged by misconnect engine 286 as a potential misconnect.

In various embodiments, misconnect engine 286 calculates RTC as follows: RTC=Deplaning Time (DT)+Gate-to-Gate Travel Time (G2GTT). However, misconnect engine 286 may calculate and/or determine RTC via any suitable method or algorithm.

In misconnect engine 286, DT may be calculated as a function of the seat assigned to a passenger and a deplaning rate. A deplaning rate may be a function of the arrival airport, the aircraft, and/or the like. Passengers may be considered to deplane by row, and by seat within row based on proximity to an aisle (i.e., aisle seats deplane before center seats, and center seats before window seats, within the same row). In various embodiments, DT is determined by the passenger seat position and the deplaning rate. In other embodiments, DT may be determined by a simplified calculation, for example a $50^{th}$ percentile estimate. For example, the total number of passengers on board may be divided by 2, and then divided by a corresponding deplaning rate to determine a fixed (estimated) deplaning time for all passengers on the flight.

In various embodiments, misconnect engine 286 is configured to model G2GTT for each connecting passenger for a flight. G2GTT may be a function of the physical distance between gates, passenger walking speed, shuttle transportation, the presence of one or more security checks, a desired time buffer before aircraft door closure, and/or the like. It will be appreciated that shuttle transportation time may be modeled by utilizing an equivalent walking distance between gates using an estimated walking speed and known shuttle travel time. (i.e., a shuttle travel portion may be replaced by an equivalent walking distance, wherein the equivalent walking distance=mean shuttle travel time*walking speed).

In misconnect engine 286, walking speed may be a user-defined parameter. In an embodiment, for a particular flight, walking speed may be initially set to a default value, for example 270 feet per minute. Walking speed may thereafter be refined and/or calibrated, for example based on actual passenger connection information, gate reader boarding scan time stamps, and/or the like. In this manner, misconnect engine 286 may develop a set of walking speed estimates customized for a variety of flights, airports, and/or the like.

In misconnect management system 115, distance between gates may be represented by a database value, for example in feet, configured to facilitate an estimate of travel time between gates. Distance between gates may be based on actual or estimated walking distances; distance between gates may also be expanded and/or contracted, for example in order to account for shuttle transit time and/or the like.

Misconnect engine 286 may be configured to use a desired time buffer before aircraft door closure. The time buffer may be based on an airline policy or similar; in various exemplary embodiments misconnect engine 286 is configured to utilize a time buffer of between 4 minutes and 11 minutes before departure. However, any suitable time buffer may be utilized. It will be appreciated that as the time buffer is increased, the incidence of passengers identified by misconnect engine 286 as potential misconnected passengers will also rise, but actual misconnected passengers may decrease; conversely, as the time buffer is decreased, the incidence of passengers identified by misconnect engine 286 as potentially misconnected passengers may also decrease, but actual misconnected passengers may increase. Accordingly, in misconnect engine 286, a time buffer for a flight or flights may be updated and/or refined, for example based at least in part on historical information, in order to improve the accuracy of misconnect management system 115.

In an embodiment, misconnect engine 286 determines G2GTT as (distance between gates/walking speed)+time buffer. Moreover, misconnect engine 286 may determine G2GTT via any suitable method and/or parameters, as desired.

In an example, in misconnect engine 286, for a passenger having a DT of 6 minutes and a G2GTT of 19 minutes, misconnect engine 286 may determine an RTC for that passenger of 6 minutes+19 minutes=25 minutes. Moreover, RTC values for a passenger may be updated and/or refined, as suitable, for example based on updated information received by or available to misconnect management system 115.

In misconnect engine 286, ATC may be the time difference between the arrival time of an arriving flight and the departure time of a departing flight. Misconnect engine 286 may utilize scheduled, estimated, and/or actual information for arrival time and departure time, depending on time horizon. Preferably, misconnect engine 286 utilizes the most accurate data source available.

Misconnect engine 286 may utilize an ETA for an upline flight. Before the upline flight departs, the ETA may be considered to be the ETD+the flight plan enroute time+ estimated taxi in time. Between upline flight departure and arrival at a destination, the ETA for the upline flight may be available from a FLIFO system. After arrival of the upline flight, the ETA may be the actual arrival time.

Misconnect engine 286 may flag one or more passengers (and/or bags or crew) as potentially misconnected, for example by comparing their respective ATC and RTC. If passenger ATC exceeds RTC, the passenger is not flagged as a misconnected passenger; however, if ATC is within a range of RTC (for example, within 10 minutes, within 20 minutes, within 30 minutes, and/or the like), misconnect management system 115 may be configured to notify a user 105 of such condition. In this manner, a user 105 can potentially avoid decisions that turn a passenger who connects with little time to spare into a passenger that is misconnected.

In various embodiments, if passenger RTC exceeds ATC, misconnect engine 286 flags that passenger as a misconnected passenger. Misconnect engine 286 may also model, determine, and/or calculate a series of hold times or other suitable modifications for a flight, and determine outcomes associated with each modification. For example, misconnect engine 286 may evaluate a set of 10 potential hold times for a flight, and identify which hold times of the set of 10 potential hold times will allow a particular misconnected passenger to connect to that flight.

When misconnect management system 115 is utilized, for example by a user 105, to implement a hold decision for a flight, it will be appreciated that the hold will typically have an effect on the arrival time of that flight at the downline station. Due at least in part to bank-related congestion, the taxi-out time of a flight that is held at the gate may differ from the taxi time incorporated into the flight plan block time. Accordingly, misconnect engine 286 may revise and/or update estimated taxi-out time for a flight in connection with various estimated hold times for the flight. Stated generally, misconnect management system 115 is configured to model, consider, and/or account for flight hold effects on downline flights and/or stations, and more generally, implications on a transportation network as a whole.

For example, because average taxi times vary depending on the time of day, in misconnect database 283, taxi time information may be stored by time of day. Misconnect engine 286 may compare the taxi time information for the scheduled departure time of a flight with the taxi time information for the delayed departure time of a flight in response to a hold being implemented. If the taxi time information differs (for example, if the taxi time associated with the decision to hold the flight is longer than the taxi time for the scheduled departure time), then the expected arrival time for the flight in question at the downline station may be delayed by a corresponding amount. In this manner, the impact of a hold decision on downline arrivals (for example, newly created missed passenger, bag, or crew connections at the downline station arising from delays at the present station) may be more fully characterized and/or considered, for example by a flight operations controller tasked with making a hold decision for a flight.

In misconnect management system 115, misconnected crew members may be identified and/or managed in a manner similar to misconnected passengers. In various embodiments, misconnect engine 286 is configured to determine a required time to connect for crew (RTCC) and an available time to connect for crew (ATCC). Due to airline process constraints, government regulations, and/or the like, connecting crew may be required to wait to deplane an aircraft until after all deplaning passengers have exited the aircraft. Accordingly, misconnect engine 286 may determine RTCC based on a time required to deplane all passengers from a flight in question, together with a G2GTT for the connecting crew.

In various embodiments, misconnect engine 286 determines ATCC as ETD (for the flight to which the crew are connecting)—Boarding Time—Inspection Time—ETA (of the flight on which the connecting crew are arriving). If RTCC exceeds ATCC, misconnect engine 286 may provide an indication of a suitable adjustment to ETD for the departing flight that would allow the crew to connect. A user 105 may implement an adjustment to the departing flight ETD based on output generated by misconnect engine 286. Alternatively, a user 105 may call out a reserve crew for the departing flight to replace the misconnected crew (for example, in instances where the expense associated with the reserve crew is smaller than the expense associated with holding the departing flight for a sufficiently long time to allow the connecting crew to connect).

In misconnect management system 115, misconnected bags may be identified and/or managed via any suitable method. In various embodiments, misconnect engine 286 is configured to determine a required time to connect for bags (RTTCB). Misconnect engine 286 may determine RTTCB via an internal optimization-based bag runner scheduling system. Alternatively, misconnect engine 286 may utilize an external bag runner scheduling system to determine RTTCB. In various embodiments, RTTCB may be determined based on a time to unload bags from an arriving flight, a time for ramp agents to transport bags between gates, a time to load bags on a departing flight, and/or the like. Misconnect engine 286 may utilize RTTCB and various other parameters to determine if a bag is a misconnected bag. For a misconnected bag, misconnect engine 286 may provide a suggested hold time for a flight sufficient to allow one or more misconnected bags to connect.

In various embodiments, in misconnect management system 115, parameters such as DT, G2GTT, ATC, RTC, ATCC, RTCC, RTTCB, and the like may be calculated as deterministic values. Additionally, in certain embodiments these parameters may be represented as normalized distributions with associated confidence intervals. Misconnect management system 115 may be configured to utilize stochastic simulation to identify a potentially misconnected passenger, bag, or crew member. Additionally, misconnect management system 115 may utilize stochastic simulation to identify the likelihood of misconnect information provided by misconnect management system 115 improving the decision-making ability of a user 105.

In some embodiments, misconnect management system 115 and/or components thereof (for example, misconnect engine 286) are configured with learning algorithms, genetic algorithms, neural networks, and/or the like. Additionally, misconnect management system 115 may be configured to repeatedly monitor, sample, and/or record planned results vs. actual results. In this manner, misconnect management system 115 may be configured to continually update, calibrate, and/or refine approaches for determination of parameters such as DT, G2GTT, and/or the like, in order to improve forecasting accuracy.

In various embodiments, misconnect management system 115 is configured with interfaces to certain external systems (for example, reservation system 260A and/or flight operations system 260B) in order to automate and/or streamline re-accommodation and/or rebooking of misconnected passengers.

In various embodiments, misconnect interface 289 is configured to facilitate interaction between a user 105 and misconnect module 280. Misconnect interface 289 is configured to present information stored in misconnect database 283 to user 105, to display simulation results determined by misconnect engine 286, to receive inputs and/or commands from user 105, and/or the like.

With reference now to FIGS. 2C-2G, misconnect interface 289 is configured to display connection information for a flight or set of flights. Misconnect interface 289 may display any suitable information associated with a flight, a passenger, a crew member, flight operations, and/or the like. In an embodiment, for a departing flight identified by misconnect engine 286 to be associated with at least one misconnected passenger, misconnect interface 289 displays an alert level value, a flight number, flight origin information, destination information, equipment information, departure gate information, scheduled departure information, misconnecting flight information, misconnecting passenger information, and/or the like.

In various embodiments, misconnect interface 289 displays a first alert for any flight where a passenger has less than a threshold amount of time to connect (for example, 30 minutes). Misconnect interface 289 may also display a second, heightened alert for any flight having a passenger identified as a probable misconnected passenger (for example, a passenger with less than 0 minutes to connect). For example, a passenger may be identified as a misconnected passenger in the event the ETD of their next flight leg is before the ETA of their current flight leg; stated another way, in order to connect, that passenger would need to depart on the downline leg before arriving via the upline leg—an impossibility. Accordingly, misconnect engine 286 may identify such a passenger as a misconnected passenger.

Misconnect interface 289 may also display information associated with the next flight to the same market as the current flight. Next flight information may be utilized by a user 105 to make a hold/no hold decision for the flight currently being considered. For example, if the next flight is close in time, a misconnected passenger may be of reduced consequence as compared to occasions when the next flight is more remote in time. Similarly, if the next flight is fully booked, a misconnected passenger may be of increased consequence as compared to occasions when the next flight has numerous available seats. In these instances, exemplary overbooking systems and methods, for example as disclosed in co-pending patent application U.S. Ser. No. 13/348,417 incorporated by reference hereinbelow, may suitably be utilized to select a course of action. Next flight information may be considered by user 105 and/or misconnect engine 286 when evaluating a hold/no hold decision for a flight.

With momentary reference to FIGS. 2D-2F, misconnect interface 289 may provide an expanded view of certain data, for example misconnecting passengers, which may be grouped, organized, and/or sorted as desired. For example, misconnecting passengers may be grouped by available time to connect, by flight origin location information (i.e., domestic, Canada, Europe, and/or the like), by airline rewards program status, and/or the like. It will be appreciated that misconnect interface 289 may present misconnecting passenger information in any suitable manner configured to facilitate making a hold/no hold decision, for example by a ramp controller, an operations manager, and/or the like.

Turning now to FIG. 2G, misconnect interface 289 may display a hold matrix representing misconnected passengers and potential outcomes associated with a variety of hold times for a flight. The contents of the hold matrix may be generated by misconnect engine 286, for example on a real-time basis, every 15 seconds, every 30 seconds, every minute, and/or the like. A user 105, for example a ramp controller, an operations control center employee, and/or the like, may utilize the hold matrix to make a hold/no hold decision for a particular flight.

For example, per the exemplary data illustrated in FIG. 2G, it can be seen that, as determined by misconnect engine 286, holding example flight 499 for 0 minutes is likely to result in 20 domestic misconnected passengers for that flight. In contrast, holding example flight 499 for 5 minutes is likely to result in 4 additional domestic passengers being able to connect, leaving 16 domestic misconnected passengers for that flight. Yet further, holding example flight 599 for 15 minutes is likely to result in all 20 potential misconnected passengers being able to connect; however, it is estimated that a 15 minute hold will result in example flight 499 arriving at its destination 18 minutes behind schedule.

It will be appreciated that, while the exemplary views in FIGS. 2C through 2G are directed to misconnected passengers, in misconnect management system 115 similar views and/or functionality may be provided for misconnected bags, misconnected crew members, and/or the like.

Misconnect interface 289 may be configured to highlight and/or raise the prominence of certain displayed information, for example a suggested hold time for a flight. In certain embodiments, a suggested hold time for a flight may be displayed in bold type, displayed with a prominent color (for example, bright green) compared to other information, or otherwise be given increased prominence. In this manner, a user 105 may quickly be able to assess misconnect interface 289 and select a course of action for a flight.

With reference now to FIG. 3, misconnect management system 115 may be configured to utilize or implement a method for misconnect management 300. In method 300, misconnect management system 115 obtains (step 310) current data, for example current passenger data, flight data, crew data, and/or the like. Current data may be provided by external systems, and/or via updates to data stored in misconnect management system 115. For each connecting passenger (for example, for a particular flight), misconnect management system 115 determines (step 320) an available time to connect. For each connecting passenger, misconnect management system 115 determines (step 330) a required time to connect. For each connecting passenger, misconnect management system 115 evaluates (step 340) the available time to connect and the required time to connect. If the required time to connect for a passenger exceeds that passenger's available time to connect, the passenger is flagged as a misconnected passenger. For each flight having at least one misconnected passenger, misconnect management system 115 evaluates (step 350) a set of potential gate hold times. Misconnect management system 115 may then suggest, recommend, and/or output (step 360) one or more courses of action, for example no gate hold, a 1 minute gate hold, a 5 minute gate hold, a 10 minute gate hold, and/or the like. If misconnect management system 115 receives information (for example, from a user 105) that a gate hold was implemented for a particular flight, misconnect management system 115 may update (step 370) data, for example to reflect the changed flight hold status, downline effects, and/or the like.

In various embodiments, misconnect management system 115 comprises software written in one or more of Visual Basic or C, and may utilize an Access database. In certain embodiments, misconnect management system 115 is configured as a distributed system wherein misconnect module 180 is operable over a plurality of servers and/or locations. In some embodiments, misconnect interface 289 is operable on a PC-class server, for example a system configured with an Intel i5 CPU or equivalent. In one embodiment, misconnect module 280 is operable to provide updated data to a user 105 via misconnect interface 289 approximately every thirty seconds. It will be appreciated that, depending on hardware, database selection, network connectivity, and/or the like, misconnect management system 115 may be configured with increased and/or reduced complexity and/or computing requirements, and the embodiments disclosed herein are by way of illustration and not of limitation.

In various embodiments, misconnect management system 115 may utilize information about an airport (for example, in order to determine gate-to-gate distances) from any suitable source, for example airport architectural drawings, public records, survey information, web-based mapping utilities, and/or the like.

Via use of misconnect management system 115, improved and/or optimal gate hold decisions may be obtained without requiring change to current gate or ramp tower practices or scheduling systems. Stated another way, because misconnect management system 115 provides current and/or real-time predictions of passenger, bag, and/or crew flow through flights and airports, ramp controllers, operations controllers, and other similar personnel can make improved hold/no hold decisions. In this manner, misconnected passengers may be reduced. Similarly, misconnected bags and/or crew may be reduced. Additionally, misconnect management system 115 enables an airline to determine an improved balance between (i) costs associated with misconnected passengers, bags, and crew, and (ii) costs associated with gate holds. In this manner, misconnect management system 115 facilitates expense reduction and thus contributes to profitability. For example, the system may determine a financial cost associated with each of the set of gate hold times, determine a financial savings associated with each of the set of gate hold times and identify the gate hold time in the set of gate hold times for which the financial cost is minimized.

Principles and features of the present disclosure may suitably be combined with principles of revenue management, for example as disclosed in U.S. patent application Ser. No. 13/348,417 entitled "Overbooking, Forecasting, and Optimization Methods and Systems" filed on Jan. 11, 2012 (now U.S. Patent Application Publication No. 2013-0132128 published on May 13, 2013), which is incorporated herein by reference in its entirety.

Principles and features of the present disclosure may suitably be combined with principles of forecasting, demand modeling, and/or the like, for example as disclosed in U.S. patent application Ser. No. 13/791,672 entitled "Demand Forecasting Systems and Methods Utilizing Unobscuring and Unconstraining" filed on Mar. 8, 2013 (now U.S. Patent Application Publication No. 2014-0257925 published on Sep. 11, 2014), U.S. patent application Ser. No. 13/791,691 entitled "Demand Forecasting Systems and Methods Utilizing Fare Adjustment" filed on Mar. 8, 2013 (now U.S. Patent Application Publication No. 2014-0257881 published on Sep. 11, 2014), and U.S. patent application Ser. No. 13/791,711 entitled "Demand Forecasting Systems and Methods Utilizing Prime Class Remapping" filed on Mar. 8, 2013 (now U.S. Patent Application Publication No. 2014-0257882 published on Sep. 11, 2014), each of which are incorporated herein by reference in their entirety.

Principles and features of the present disclosure may also suitably be combined with principles of reserve forecasting, for example as disclosed in U.S. patent application Ser. No. 13/793,049 entitled "Reserve Forecasting Systems and Methods" filed on Mar. 11, 2013 (now U.S. Patent Application Publication No. 2014-0257900 published on Sep. 11, 2014), which is incorporated herein by reference in its entirety.

Principles and features of the present disclosure may also suitably be combined with principles of departure sequencing, for example as disclosed in U.S. patent application Ser. No. 13/833,761 entitled "Departure Sequencing Systems and Methods" filed on Mar. 15, 2013 (now U.S. Patent Application Publication No. 2014-0278036 published on Sep. 18, 2014), which is incorporated herein by reference in its entirety.

While the present disclosure may be described in terms of an airport, an aircraft, and/or the like, one skilled in the art can appreciate that similar features and principles may be applied to other transportation systems and vehicles such as, for example, buses, trains, ships, trucks, automobiles and/or the like.

While the exemplary embodiments described herein are described in sufficient detail to enable those skilled in the art to practice principles of the present disclosure, it should be understood that other embodiments may be realized and that logical and/or functional changes may be made without departing from the spirit and scope of the present disclosure. Thus, the detailed description herein is presented for purposes of illustration and not of limitation.

While the description references specific technologies, system architectures and data management techniques, practitioners will appreciate that this description is of various embodiments, and that other devices and/or methods may be implemented without departing from the scope of principles of the present disclosure. Similarly, while the description references a user interfacing with the system via a computer user interface, practitioners will appreciate that other interfaces may include mobile devices, kiosks and handheld devices such as mobile phones, smart phones, tablet computing devices, etc.

While the steps outlined herein represent exemplary embodiments of principles of the present disclosure, practitioners will appreciate that there are any number of computing algorithms and user interfaces that may be applied to create similar results. The steps are presented for the sake of explanation only and are not intended to limit the scope of the present disclosure in any way. Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all of the claims.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to utilize such feature, structure, or characteristic in connection with other embodiments whether or not explicitly described. After reading the description, it will be apparent to one skilled in the relevant art(s) how to implement principles of the disclosure in alternative embodiments.

It should be understood that the detailed description and specific examples, indicating exemplary embodiments, are given for purposes of illustration only and not as limitations. Many changes and modifications may be made without departing from the spirit thereof, and features and principles of the present disclosure include all such modifications. Corresponding structures, materials, acts, and equivalents of all elements are intended to include any structure, material, or acts for performing the functions in combination with other elements. Reference to an element in the singular is not intended to mean "one and only one" unless explicitly so stated, but rather "one or more." Moreover, when a phrase similar to "at least one of A, B, or C" or "at least one of A, B, and C" is used in the claims or the specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method for reducing passenger misconnect in a transportation system, the method comprising:

determining, by a processor, an available time to connect (ATC) for a passenger;

determining, by the processor, a required time to connect (RTC) for the passenger;

periodically comparing, by the processor, the ATC to the RTC to identify the passenger as a misconnected passenger when the RTC exceeds the ATC;

periodically determining, by the processor, that the ATC is within a range of the RTC and notifying the passenger based on the determining;

modeling, by the processor, Gate-to-Gate Travel Time (G2GTT) based on physical distance between gates, passenger walking speed, shuttle transportation, presence of security checks, and a desired time buffer before door closure on the second airplane;

creating, by the processor, a graph network model representing the airport, wherein the graph network model comprises a plurality of nodes and a plurality of links, wherein the plurality of nodes include a gate node, airlinks, a runway with an entrance node and an exit node, and a runway crossing with a crossing node and ground links, and wherein the graph network model is a directed graph;

calibrating, by the processor, parameters of the graph network model utilizing historical airplane flight information for the airport;

creating, by the processor, calibrated parameters based on different operating characteristics of the airport;

periodically determining, by the processor, a set of gate hold times for the second airplane in the transportation system, wherein the second airplane is associated with the misconnected passenger;

communicating, by the processor and to a user, a set of suggested gate hold times for the second airplane;

periodically modifying, by the processor and responsive to the set of suggested gate hold times, a gate hold time for the second airplane to allow the misconnected passenger to board the second airplane;

assessing, by the processor, connection information associated with the misconnected passenger from the first airplane; and repeatedly executing, by the processor, the graph network model to obtain a suggested gate pushback time for the second airplane based on the assessing of the connection information.

2. The method of claim 1, further comprising determining, by the processor, an effect of each of the set of gate hold times on the misconnected passenger.

3. The method of claim 1, further comprising determining, by the processor, an effect of each of the set of gate hold times on the second airplane, wherein the second airplane is downline from the first airplane.

4. The method of claim 1, further comprising determining, by the processor, an effect of each of the set of gate hold times on the transportation system.

5. The method of claim 1, further comprising:
determining, by the processor, a financial cost associated with each of the set of gate hold times; and
identifying, by the processor, the gate hold time in the set of gate hold times for which the financial cost is minimized.

6. The method of claim 1, further comprising:
modeling, by the processor, movement of an item of luggage through the transportation system;
identifying, by the processor, the item of luggage as a misconnected item of luggage;
determining, by the processor, a second set of gate hold times for a second airplane having a flight in the transportation system, wherein the second airplane is associated with the misconnected item of luggage;
modeling, by the processor, movement of a crew member through the transportation system;
identifying, by the processor, the crew member as a misconnected crew member; and
determining, by the processor, a third set of gate hold times for a third airplane having a flight in the transportation system, wherein the third airplane is associated with the misconnected crew member.

7. The method of claim 6, wherein the first airplane and the second airplane are the same airplane.

8. The method of claim 6, wherein the first airplane and the second airplane are different airplanes.

9. The method of claim 6, wherein the first airplane, the second airplane, and the third airplane are the same airplane.

10. The method of claim 6, wherein the first airplane, the second airplane, and the third airplane are different airplanes.

11. The method of claim 1, further comprising:
scheduling, by the processor, a departure time for the first airplane of a plurality of airplanes that is modeled on gate node business rules to model a taxi procedure for the first airplane;
initializing, by the processor, a status of the first airplane flight that is modeled on gate node business rules to further model the taxi procedure for the first airplane;
allowing, by the processor, the first airplane to occupy a node on a ground link, in response to the first airplane approaching the node, a next ground link having available capacity and the node not being occupied by the second airplane;
checking, by the processor, potential future directional head-to-head airplane conflicts with the second airplane to avoid gridlock;
triggering, by the processor and in response to the second airplane waiting on the last ground link, movement of the second airplane forward to wait on the next ground link as more space is made available on the next ground link;
releasing, by the processor, the node of the currently occupying airplane;
creating, by the processor and in response to the second airplane waiting for the node, a trigger to enter the node for the second airplane;
implementing, by the processor, business rules for checking runway blockage by arrivals or crossings;
triggering, by the processor and after a take-off event, another take-off event in response to the first airplane waiting on the runway entrance node and no blockage is applied;
scheduling, by the processor, multiple times for the first airplane to pass the current runway node to model the runway crossing for the first airplane in the graph network model.

12. The method of claim 1, wherein the ATC for the passenger is determined based at least in part on a current arrival time of the first airplane and a scheduled departure time for the second airplane.

13. The method of claim 1, wherein the processor comprises a misconnect database, a misconnect engine, and a misconnect interface.

14. The method of claim 1, further comprising:
updating, by the processor and in the misconnect database, a departure time for the second airplane to implement the gate hold time for the second airplane; and
identifying, by the processor, the passenger as a connected passenger responsive to implementation of the gate hold time for the second airplane.

15. The method of claim 1,
wherein the RTC is determined by adding Deplaning Time (DT) and Gate-to-Gate Travel Time (G2GTT),
wherein the DT is based on a seat assigned to the passenger and a deplaning rate,
wherein the deplaning rate is based on arrival airport and type of first airplane, and
wherein the seat assigned is based on aisle seat, middle seat and window seat.

16. The method of claim 1, further comprising:
storing, by the processor, the data in the misconnect database;
tuning, by the processor, the misconnect database to optimize the misconnect database performance, wherein the tuning includes placing frequently used files on separate file systems to reduce in and out bottlenecks;
designating, by the processor, a key field in data tables of the misconnect database to speed searching for the data; and
obtaining, by the processor, the data from the frequently used files.

17. The method of claim 1, further comprising periodically refining, by the processor, the passenger walking speed by using actual passenger connection information based on a time-based scanner that scans a passenger boarding pass and records a gate reader boarding scan with a time stamp reflecting a time that the passenger passed through a gate and boarded the second airplane.

18. The method of claim 1, further comprising:
allowing, by the processor, the first airplane to occupy a node on a ground link, in response to the first airplane approaching the node, a next ground link having available capacity and the node not being occupied by the second airplane;
checking, by the processor, potential future directional head-to-head airplane conflicts with the second airplane to avoid gridlock;
triggering, by the processor and in response to the second airplane waiting on the last ground link, movement of the second airplane forward to wait on the next ground link as more space is made available on the next ground link.

19. The method of claim 1, further comprising obtaining, by the processor, data from an airline central data repository, wherein the data includes information about a plurality of airline flights, passengers, airplanes, and airports.

20. A system comprising:
a processor; and
a tangible, non-transitory memory configured to communicate with the processor,
the tangible, non-transitory memory having instructions stored thereon that, in response to execution by the processor, cause the processor to perform operations comprising:
determining, by the processor, an available time to connect (ATC) for a passenger;
determining, by the processor, a required time to connect (RTC) for the passenger;
periodically comparing, by the processor, the ATC to the RTC to identify the passenger as a misconnected passenger when the RTC exceeds the ATC;
periodically determining, by the processor, that the ATC is within a range of the RTC and notifying the passenger based on the determining;
modeling, by the processor, Gate-to-Gate Travel Time (G2GTT) based on physical distance between gates, passenger walking speed, shuttle transportation, presence of security checks, and a desired time buffer before door closure on the second airplane;
creating, by the processor, a graph network model representing the airport,
wherein the graph network model comprises a plurality of nodes and a plurality of links,
wherein the plurality of nodes include a gate node, airlinks, a runway with an entrance node and an exit node, and a runway crossing with a crossing node and ground links, and
wherein the graph network model is a directed graph;
calibrating, by the processor, parameters of the graph network model utilizing historical airplane flight information for the airport;
creating, by the processor, calibrated parameters based on different operating characteristics of the airport;
periodically determining, by the processor, a set of gate hold times for the second airplane in the transportation system, wherein the second airplane is associated with the misconnected passenger;
communicating, by the processor and to a user, a set of suggested gate hold times for the second airplane;
periodically modifying, by the processor and responsive to the set of suggested gate hold times, a gate hold time for the second airplane to allow the misconnected passenger to board the second airplane;
assessing, by the processor, connection information associated with the misconnected passenger from the first airplane; and
repeatedly executing, by the processor, the graph network model to obtain a suggested gate pushback time for the second airplane based on the assessing of the connection information.

* * * * *